Feb. 2, 1932.   B. W. JONES   1,843,769
CONTROL SYSTEM
Filed April 25, 1930
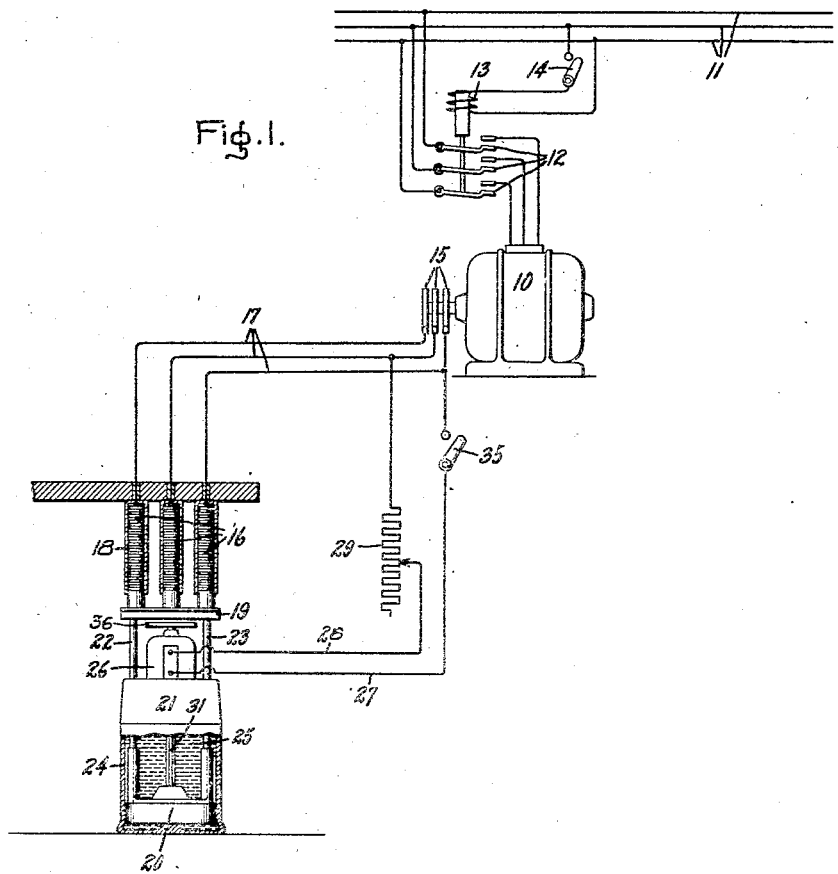
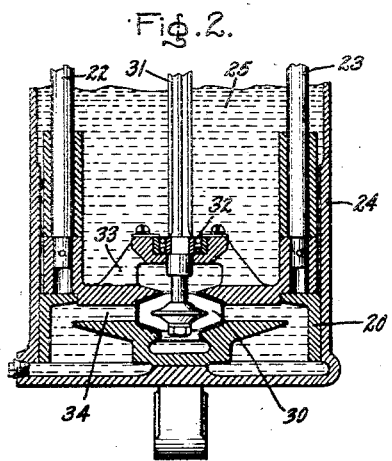
Inventor:
Benjamin W. Jones,
by Charles E. Tullar
His Attorney.

Patented Feb. 2, 1932

1,843,769

UNITED STATES PATENT OFFICE

BENJAMIN W. JONES, OF SCHENECTADY, NEW YORK, ASSIGNOR TO GENERAL ELECTRIC COMPANY, A CORPORATION OF NEW YORK

CONTROL SYSTEM

Application filed April 25, 1930. Serial No. 447,355.

This invention relates to control systems more particularly to systems for controlling the operations of electric motors, and has for an object the provision of a simple, reliable and inexpensive device for regulating the speed of an electric motor.

A further object of this invention is the provision of a motor control system in which a speed regulating device also operates to provide protection of the motor in the event of interruption of the supply source.

In carrying my invention into effect in one form thereof I provide a variable pressure responsive resistance, such for example as a carbon pile resistance, in the circuit of the motor to be controlled, together with a fluid pressure device responsive to variations in an operating condition of a motor for varying the pressure exerted on the resistance to effect a controlling operation of the motor.

In illustrating my invention in one form thereof I have shown it as embodied in a system for controlling the speed of an alternating current motor.

For a better and more complete understanding of the invention reference should now be had to the following specification and the accompanying drawings, in which Fig. 1 is a simple diagrammatical illustration of an embodiment of the invention, and Fig. 2 is a detail view.

Referring now to the drawings, a motor 10 may be employed for any useful industrial purpose, such for example as driving the rolls of a paper making machine or the rolls of a printing press or the like. As shown in the drawings, the motor 10 is a wound rotor induction motor and is supplied with electrical energy from any suitable three-phase source of power such as that represented in the drawings by three conductors 11 to which its primary winding is connected by means of the contactor 12. An electro-magnet 13 serves to operate the contactor 12 to the closed position when the manually operated pilot switch 14 is in the closed position. The terminals of the secondary winding of the motor 10 are brought out to the slip rings 15.

The speed of the motor 10 may be varied by means of a variable carbon pile resistance 16 which as shown in the drawings consists of three stacks of carbon discs which are connected to the slip rings 15 by means of the conductors 17. Each of the carbon pile stacks is enclosed in a cylindrical holder 18 which may be constructed of any suitable insulating material. As is well understood by persons skilled in the art the ohmic value of a carbon pile resistance depends upon the amount of pressure which is exerted thereon; the ohmic value being inversely proportional to the pressure. A cross head 19 which may be constructed of any suitable conducting material forms the Y point for the three legs of the carbon pile resistor 16, and also serves to vary the pressure exerted upon the carbon pile in response to the pressure exerted on the movable piston 20 of the hydraulic operator 21; the cross hear 19 being suitably connected to the piston 20 by means of the connecting rods 22 and 23.

Although any suitable device may be employed for varying the pressure exerted on the carbon pile resistance I prefer to employ the hydraulic operator described and claimed in copending application Serial No. 415,341 filed December 19, 1929, Walter O. Lum, and assigned to the same assignee as the assignee of the present invention. This hydraulic operator is provided with a wall 24 which defines a chamber for containing a fluid 25. Although any suitable fluid may be used in the hydraulic operator, it is preferred to employ a fluid of medium viscosity such for example as a #6 oil.

A small auxiliary electric motor 26 is arranged on the top of the wall 24 with its shaft extending in a vertical direction and is secured to the top of the containing wall 24 by any suitable connecting means (not shown). This auxiliary motor may be of any suitable type but is preferably a series wound universal type motor, i. e., it is adapted to run when supplied either with direct or alternating current. Electrical energy of a frequency and voltage that is proportional to the slip of the motor 10 is supplied to the auxiliary motor 26 from the slip rings 15 to which it is connected by means of the conductors 27 and 28. Since the slip of an alternating current motor is inversely proportional to the speed at which it is operating, it will be clear that the motor 26 operates at a speed which is proportional to the slip of the motor 10 and consequently inversely proportional to the operating speed of the motor 10. The speed of the auxiliary motor 26 may be adjusted as desired by means of the speed adjusting resistance 29 which is connected in circuit between the slip rings 15 of the main motor and the primary windings of the auxiliary motor and the acceleration of the motor 26 and consequently of the motor 10 may be limited to a desired value by any suitable means such for example as the flywheel 36 of suitable mass and dimensions mounted upon the shaft of motor 26.

The piston 20 of the hydraulic operating device is hollowed to provide a chamber to receive the radial vane impeller 30 which is mounted integrally upon the impeller shaft 31 so as to rotate therewith. As shown in the drawings, the impeller shaft 31 is journaled in a self-aligning bearing 32 which is mounted in the piston 20.

Ducts 33 are provided in the piston 20 to afford communication between the impeller chamber and the liquid space above the piston and ducts 34 afford communication from the impeller chamber to the liquid space beneath the piston 20. When rotating the radial vane impeller 30 causes liquid to be drawn from the space above the piston in the impeller chamber and then to be expelled from the impeller chamber in a radial direction and into the ducts 20 and thence to the space beneath the piston, thus constituting the device a centrifugal pump. The liquid pressure that is exerted on the lower face of the piston 20 is proportional to the square of the speed at which the impeller 30 rotates.

The auxiliary motor is provided with a hollow shaft (not shown) which is splined internally to receive the externally splined impeller shaft 31. As thus constructed, it will be clear that the shaft of the auxiliary motor when the latter is rotating will cause the impeller shaft 31 to rotate with it while permitting axial, i. e., vertical movement of the impeller shaft 31, impeller 30 and piston 20 as a unit.

Since the speed of the motor 26 is inversely proportional to the speed of the motor 10 and since the pressure exerted on the lower side of the piston 20 is proportional to the square of the speed of the auxiliary motor 26 the pressure exerted on the piston 20 and consequently on the carbon pile resistance 16 is inversely proportional to the square of the speed of the motor 10.

As thus constructed and arranged the operation of the system is as follows: With the contactor 12 and the auxiliary motor connecting switch 35 operated to the closed position the motor 10 will operate at a predetermined speed that is determined by the setting of the speed adjusting resistor 29. That is to say, the auxiliary motor 26 and the impeller 30 driven thereby cause a liquid pressure to be exerted on the lower face of the piston 20 which acts against the pressure of a spring (not shown) and compresses the carbon pile resistor 16 the necessary amount to cause the motor 10 to run at a speed that is determined by the initial setting of the spring and the setting of the auxiliary motor speed adjusting resistor 29. Should this condition of equilibrium become upset for any reason, such for example by an increase in load on the motor 10, its speed will drop slightly below the predetermined value. As a result of this drop in speed the frequency of the alternating current supplied to the auxiliary motor 26 from the slip rings 15 will be increased, thereby proportionally increasing the speed of the auxiliary motor 26 and likewise the speed of the impeller 30 which is driven thereby. The increased speed of the impeller 30 will effect an increase in pressure on the lower surface of the piston 20 thereby causing it and the cross head 19 to move upwardly to compress the carbon pile resistor 16.

As previously pointed out the impeller 30 and the splined impeller shaft 31 both move upwardly as a unit with the piston. The increased pressure on the carbon pile resistance 16 decreases the ohmic value of the resistance in the secondary circuit of the motor 10 as a result of which its speed is increased until the condition of equilibrium is established at which time the speed of the motor 10 will have approximately reached its former value.

It is to be observed that the speed regulating action just described occurs very promptly since the pressure on the lower surface of the piston 20 and consequently on the carbon pile resistor 16 increases at a rate that is approximately inversely proportional to the square of the speed of the motor 10.

If the speed of the motor 10 should increase above its predetermined value the speed of the auxiliary motor 26 will decrease due to the decrease in the frequency of the alternating current applied thereto by the slip rings 15. Consequently the speed of the impeller 30 and the liquid pressure exerted on the lower face of the piston 20 will decrease, as a result of which the pressure on the carbon pile resistor 16 will be decreased and the ohmic value of the resistance in the secondary of the motor 10 increased. As a result of the increase in the secondary resistance of the motor 10 the speed of the latter will be decreased until the equilibrium condition is reestablished at which time the motor 10 will operate at approximately its former speed.

It is also to be noted that in addition to the above described regulating action my invention also automatically provides immediate protection for the motor 10 in the event of failure of the power source from which it is supplied. If for any reason the electromotive force should decrease below the value necessary to maintain the line contactor 12 closed, the latter will drop to the open position and both the primary and secondary windings will be deenergized. Deenergization of the secondary winding results in deenergization of the auxiliary motor 26 which, due to the frictional load on the impeller 30 is brought to rest very rapidly thereby rapidly reducing the liquid pressure exerted against the lower surface of piston 20 and permitting the latter to descend to its lower position to release the pressure exerted on carbon piles 16. The ohmic resistance of the carbon piles is increased as the pressure is released and consequently the full value of the resistance is inserted in the secondary circuit of motor 10. When the line contactor 12 recloses upon reestablishment of normal conditions of the supply source the hydraulic pressure device decreases the resistance of the carbon piles at a rate dependent upon the inertia of the device which as previously pointed out may be adjusted to any desired value by the proper design of the flywheel 36.

It will thus be observed that my invention provides a speed regulating system in which an hydraulic pressure device serves to vary the regulating resistance in response to variations in motor speed and also serves immediately to insert the full value of this resistance in the motor circuit upon a failure of the source of supply thus insuring protection of the motor against a heavy inrush of current when the line contactor is reclosed after reestablishment of the source.

Although in accordance with the provisions of the patent statutes I have described my invention as embodied in concrete form I would have it understood that the particular apparatus and connections shown and described are merely illustrative and that the invention is not limited thereto since alterations and modifications will readily suggest themselves to persons skilled in the art without departing from the true spirit of the invention or the scope of the annexed claims.

What I claim as new and desire to secure by Letters Patent of the United States is:

1. A control system for an alternating current motor having primary and secondary windings, comprising a variable resistance connected in circuit with one of said windings, means for connecting said primary winding to a source of supply, and means comprising a fluid pressure device responsive to the frequency of the current in said secondary winding for controlling said resistance to maintain constant speed, and responsive to disconnection of said primary windings from the supply source to increase said resistance to full value.

2. In a system for controlling the operation of an electric motor, means for connecting the motor to a source of supply, a variable pressure responsive resistance connected in circuit with the motor, means including an hydraulic device operable in response to variation in the speed of the motor for varying the pressure on said resistance and operable in response to an interruption of the supply source for increasing the ohmic value of said resistance.

3. In a system for controlling the operation of an alternating current motor provided with a primary winding and with a secondary winding, means for connecting said primary winding to a source of supply, a variable pressure responsive resistance connected in circuit with one of said windings and having an ohmic value inversely proportional to the pressure exerted thereon, means including an auxiliary motor connected to said secondary circuit and an hydraulic device driven thereby for varying the pressure on said resistance in inverse proportion to the speed of the alternating current motor and operable in response to a failure of said supply source for decreasing the pressure on said resistance to increase its ohmic value.

4. A speed regulating system for an alternating current motor having primary and secondary windings, comprising a variable pressure responsive resistance connected in circuit with the secondary winding, means for connecting said primary winding to a supply source and means comprising a fluid pressure device responsive to the frequency of the current in said secondary winding for varying the pressure on said resistance in proportion to said frequency for regulating the speed of the motor and for increasing said resistance to full value upon disconnection of said primary winding from the source of supply.

5. In a motor speed regulating system a pressure responsive resistance, means for connecting said resistance in the motor circuit, and means including an hydraulic pressure device for responding to variations in the speed of the motor to vary the pressure on said resistance in inverse relation to said speed variations to restore the original speed of the motor.

6. In a motor speed regulating system, a pressure responsive resistance having an ohmic value varying inversely with the pressure exerted thereon, means for connecting said resistance in the motor circuit and means including a fluid pressure device for responding to the speed of the motor to exert a pressure on said resistance inversely proportional to the square of the motor speed for maintaining the speed of the motor substantially constant.

7. In a motor control system, a wall defining a chamber for containing a fluid, means for responding to a motor operating condition for varying the fluid pressure in said chamber in inverse relation to the magnitude of said operating condition, a pressure responsive resistance, means for connecting said resistance in the motor circuit, and means including a piston located in said chamber and responsive to the fluid pressure therein for varying said resistance in inverse relation to the pressure exerted on said piston for effecting a controlling operation of the motor.

8. In a system for controlling the operation of a main driving motor, a pressure responsive resistance, means for connecting said resistance in the motor circuit, a wall defining a chamber for containing a fluid, means including an auxiliary electric motor for responding to the speed of the main motor and a centrifugal pump driven by said auxiliary motor for varying the fluid pressure in said chamber, and means including a piston located in said chamber and responsive to variations in said fluid pressure for varying the pressure on said resistance to control the speed of the main driving motor.

9. A motor speed regulating system comprising a wound rotor induction motor provided with primary and secondary circuits, a variable carbon pile resistance connected in said secondary circuit and having an ohmic value inversely proportional to the pressure exerted thereon, a wall defining a chamber for containing a fluid, means including a piston located in said chamber for exerting a pressure on said resistance and means including an auxiliary electric motor connected to said secondary circuit and a centrifugal pump impeller located in said chamber and driven by said auxiliary motor for causing said piston to exert a pressure on said resistance inversely proportional to the square of the speed of said induction motor for maintaining the speed of the induction motor substantially constant at a predetermined value.

10. A motor speed regulating system comprising a wound rotor induction motor provided with primary and secondary circuits, a variable resistance connected in said secondary circuit and having an ohmic value inversely proportional to the pressure exerted thereon, a wall defining a chamber for containing a fluid, a piston located in said chamber for exerting a pressure on said resistance, means including an auxiliary electric motor connected to said secondary circuit and a pumping device located in said chamber and driven by said auxiliary motor for responding to variations of the speed of said induction motor from a predetermined value and causing said piston to vary the pressure exerted on said resistance in inverse relation to said speed variations to maintain the speed of said induction motor substantially constant at said predetermined value.

In witness whereof, I hereunto set my hand this 24th day of April, 1930.

BENJAMIN W. JONES.